United States Patent Office 3,285,977
Patented Nov. 15, 1966

3,285,977
HYDRATION OF OLEFINS IN THE PRESENCE OF A SOLVENT
Alfred M. Henke, Springdale, Pa., Raymond C. Odioso, Chatham, N.J., and Bruce K. Schmid, McCandless Township, Allegheny County, Pa., assignors to Gulf Research & Development Company, Pittsburgh, Pa., a corporation of Delaware
No Drawing. Filed Apr. 12, 1962, Ser. No. 186,835
7 Claims. (Cl. 260—641)

This application is a continuation-in-part of our copending application Serial Number 760,072, filed September 10, 1958, and now abandoned.

This invention relates to the catalytic hydration of olefins to their corresponding alcohols and more particularly this invention relates to the catalytic hydration of olefins to their corresponding alcohols in the presence of a solid catalyst.

Conventionally, in the hydration of olefins with a solid hydration catalyst, gaseous olefin and liquid water are passed over the catalyst to form a product alcohol. The feed stream usually contains a large molar excess of water over olefin and this large excess of water in part serves to remove from the surface of the catalyst product alcohol which is formed. This product alcohol is then recoverable from the water by suitable means such as distillation. While low molecular weight alcohols such as ethyl alcohol and propyl alcohols are readily miscible with water and can be removed from the catalyst surface by dissolving in the excess of feed water employed, higher molecular weight alcohols such as $C_4$, $C_5$, $C_6$, $C_7$ and higher alcohols are not readily removed by water since these high molecular weight alcohols are not as miscible with water as the lower molecular weight alcohols. Since the effect of the catalyst is exerted at its surface, the accumulation of product alcohol at the catalyst surface appreciably slows the rate of conversion by preventing fresh olefin and water from coming into contact with the catalyst. In order for the reaction rate to remain undiminished it is necessary that the alcohol product be removed from the catalyst so as to provide a free site at which fresh olefin and water can contact the catalyst surface and be converted to the corresponding alcohol.

In accordance with this invention, we have discovered that the catalytic hydration over a solid hydration catalyst of olefins containing more than three carbon atoms to form a corresponding alcohol which is difficultly soluble in water is substantially increased by conducting the hydration with both the water and the olefin reactants in the liquid phase and in the presence of a liquid solvent. The solvent employed is miscible with both the liquid water reactant and the liquid olefin reactant to form solvent containing solutions with each in which the product alcohol has increased solubility. However, the solvent employed does not cause the olefin and water to substantially dissolve in each other but permits the olefin and water phases to remain separate. The solvent employed is miscible with water and functions by dissolving with water to form a water-solvent solution in which the product alcohol is soluble. The olefin reactant is maintained in the liquid phase and the solvent forms a separate solution with the olefin in which the product alcohol dissolves. The water-containing solution and the olefin-containing solution are mutually immiscible.

The material employable as a solvent in accordance with this invention has certain important characteristics. First, the solvent material is readily miscible with the reactants to form solvent-containing solutions therewith. These solvent-containing solutions have increased solubility for the product alcohol, as compared to the reactants in the absence of the solvent, and thereby tend to remove product from the catalyst surface as soon as it is formed, thus freeing the catalyst surface for fresh reactants and also driving the reaction equilibrium in the direction of formation of alcohol. Secondly, the solvent maintains the olefin and water in separate liquid phases, in the presence of the solvent, are insoluble in each other so that the water phase is substantially free of olefin and the olefin phase is substantially free of water. A third characteristic of the solvent material that can be employed is that the solvent is not the same material as the product which is being formed in the reaction. As well as being difficulty soluble in water, the presence of additional product also tends to reverse the desired reaction equilibrium. Accordingly, if the solvent material which is employed is itself an alcohol it should not be the same alcohol which is being formed during the reaction but should be a different alcohol.

Typical solvents for use in accordance with this invention are oxygenated organic compounds which are miscible with water. Examples of such oxygenated organic solvents are methyl alcohol, ethyl alcohol, normal propyl alcohol, isopropyl alcohol, tertiaryl butyl alcohol, ethylene glycol, diethylene glycol, methyl ethyl ether, ethylene glycol monomethyl ether, acetic acid, propionic acid, acetone, methyl ethyl ketone, cyclohexanone, ethylene oxide, trimethylene oxide, dioxane, etc.

Alcohols are desirable solvent materials to be employed in accordance with this invention. Whatever alcohol is employed as a solvent must be miscible with water and therefore the use of alcohols as solvents is limited to methyl alcohol, ethyl alcohol, normal propyl alcohol, isopropyl alcohol and tertiary butyl alcohol. However, when the solvent for the product alcohol is itself an alcohol it is highly preferable that it be a secondary alcohol rather than a primary alcohol. We have found that when a primary alcohol is employed as a solvent there is a significant formation of ethers by reaction between the primary alcohol solvent and the olefin feed. Whereas primary alcohols form a significant quantity of ethers, only negligible quantities of ethers are formed when secondary alcohols are employed. Since olefin hydration is a carbonium ion type reaction, whatever hydration catalyst is employed is likely to be suited to the furtherance of this type of reaction generally and, since ethers are also formed by a carbonium ion reaction mechanism, the catalyst present will generally tend to further this reaction also. Therefore, if it is desired to substantially avoid the formation of ethers, it is especially important to limit the choice of an alcohol as a solvent to a secondary alcohol. Accordingly, the most preferable alcohol solvent is isopropyl alcohol since this is both a secondary alcohol and is miscible with water. It is noted that, unless ethylene is employed as a charge stock, primary alcohols will not generally be produced by the hydration of charge olefins since olefins are hydrated in accordance with Markownikoff's rule whereby the hydroxy group is attached to an interior carbon atom to form a secondary or a tertiary alcohol.

The amount of solvent to be employed varies depending upon the particular solvent, the olefin charged, etc., but the amount of solvent added should be sufficient to produce a homogeneous product alcohol-water-solvent phase and a separate homogeneous product alcohol-olefin-solvent phase, and to keep the catalyst surface generally free of product alcohol. Generally, the amount of solvent employed is between about 0.5 and 20 volumes of solvent for each volume of water feed to the reactor and preferably between about 0.25 and 4 volumes of solvent for each volume of water. Since the solvent employed does not cause the water and olefin phase to appreciably dissolve in each other, the effluent from the reactor will comprise two phases, an aqueous phase and a hydrocarbon phase. The aqueous phase contains product alcohol, solvent and water, while the hydrocarbon phase contains unreacted olefin, product alcohol and solvent.

In the practice of this invention, conventional hydration reaction temperatures of 175° F. to 600° F. are employed, depending upon the catalyst being utilized. Any solid hydration catalyst is employed in accordance with this invention. Suitable catalysts are blue oxide of tungsten, tungsten sulfide, nickel sulfide, unsupported nickel-tungsten sulfide, supported sulfided nickel-tungsten sulfide and ion exchange resins such as sulfonated polystyrene-divinylbenzene copolymer. Other solid olefin hydration catalysts are alumina, thoria, zirconia, aluminum sulfate, kaolin, titania, etc. Although the process may be carried out batchwise, it is preferably carried out in a continuous manner. The space velocity is between 0.2 and 20.0 liquid volumes of olefin per hour per volume of catalyst generally and preferably 0.5 to 5.0 liquid volumes of olefin per hour per volume of catalyst. The water to olefin mole ratio is between 1 and 50. The reactants pass through the reactor in either upflow or downflow operation although downflow operation is generally preferred. Whatever pressure is employed must be high enough to maintain at least part and preferably all of the water feed, reactant olefin and solvent, respectively, in the liquid state. In general, the hydration pressure range to be employed is between about 150 to 20,000 pounds per square inch gauge. The reaction temperature will depend in large degree upon the particular catalyst being employed and this temperature will in turn determine the pressure to be employed.

Table 1 shows the results of three sets of tests in which methyl butenes were hydrated to tertiary amyl alcohol by being passed together with water over protonated Amberlite IR–120 ion exchange resin catalyst, which is a sulfonated polystyrenedivinylbenzene copolymer. The tests were conducted at a temperature of about 250° F. and at a hydrocarbon space velocity of about 1. Each set of tests consisted of two runs, the first run conducted at a pressure of 100 pounds per square inch gauge, at which pressure the methyl butene reactant was in the vapor phase, and the second run at a pressure of 200 pounds per square inch gauge, at which pressure the methyl butene reactant was in the liquid phase. In each of the first set of tests no solvent was employed. In each of the second set of tests, acetic acid was continuously introduced to the reactor as a solvent. In each of the third set of tests, isopropyl alcohol was continuously introduced to the reactor as a solvent. In all the tests, water was present in the liquid phase. In the tests employing a solvent, the solvent was present in the liquid phase.

TABLE 1
*Hydration of methyl butenes over ion-exchange resin catalyst*

| Run | 1 | | 2 | | 3 | | 4 | | 5 | | 6 | |
|---|---|---|---|---|---|---|---|---|---|---|---|---|
| Solvent | None | | None | | Acetic Acid | | Acetic Acid | | Isopropyl Alcohol | | Isopropyl Alcohol | |
| Temperature, °F | 250.4 | | 250.8 | | 250.6 | | 250.0 | | 249.0 | | 250.8 | |
| Pressure, p.s.i.g. | 100 | | 200 | | 100 | | 200 | | 100 | | 200 | |
| Phase of Olefin | Vapor | | Liquid | | Vapor | | Liquid | | Vapor | | Liquid | |
| Space Velocity (LHSV Based on Hydrocarbon) | 1.00 | | 1.02 | | 1.00 | | 0.99 | | 1.00 | | 0.93 | |
| H₂O to Olefin Ratio (Molar) | 3.22 | | 2.91 | | 1.57 | | 1.60 | | 1.51 | | 1.63 | |
| Solvent to Water Ratio (Volume) | | | | | 1.0 | | 1.0 | | 1.0 | | 1.0 | |
| | Grams | Moles | Grams | Moles | Grams | Moles | Grams | Moles | Grams | Moles | Grams | Moles |
| Charge to Reactor: | | | | | | | | | | | | |
| Methyl Butenes | 89.4 | 1.227 | 90.7 | 1.297 | 89.4 | 1.277 | 88.8 | 1.270 | 89.4 | 1.277 | 83.4 | 1.192 |
| Water | 74.0 | 4.11 | 68.0 | 3.78 | 36.0 | 2.00 | 36.5 | 2.03 | 34.5 | 1.930 | 35.0 | 1.945 |
| Solvent | | | | | 37.8 | .630 | 38.3 | .638 | 29.1 | .485 | 29.5 | .491 |
| Liquid Products From Reactor: | | | | | | | | | | | | |
| Water Layer | 95.7 | 5.23 | 74.4 | 4.03 | 82.1 | 3.14 | 85.2 | 3.06 | 63.8 | 2.99 | 47.4 | 2.25 |
| Hydrocarbon Layer | 75.5 | 1.073 | 83.7 | 1.183 | 87.1 | 1.236 | 85.8 | 1.196 | 100.5 | 1.455 | 102.5 | 1.450 |
| T-Amyl Alcohol: | | | | | | | | | | | | |
| In Water Layer | 1.87 | .0209 | 2.11 | .0234 | 3.4 | .0386 | 7.1 | .0805 | 0.7 | .0081 | 1.3 | .0149 |
| In Hydrocarbon Layer | 2.09 | .0237 | 4.66 | .0536 | 5.63 | .0640 | 16.86 | .1916 | 4.95 | .0561 | 23.70 | .269 |
| Methyl Butenes: | | | | | | | | | | | | |
| In Water Layer | | | | | 0.2 | .0038 | 0.3 | .0052 | 0.1 | .0012 | | .0007 |
| In Hydrocarbon Layer | 92.3 | 1.050 | 99.4 | 1.130 | 98.5 | 1.120 | 77.5 | .882 | 102.0 | 1.16 | 69.5 | .790 |
| Water in Water Layer | 93.9 | 5.21 | 72.3 | 4.01 | 46.0 | 2.55 | 43.3 | 2.40 | 49.7 | 2.76 | 37.8 | 2.10 |
| Solvent: | | | | | | | | | | | | |
| In Water Layer | | | | | 33.6 | .544 | 34.6 | .576 | 13.4 | .223 | 8.3 | .138 |
| In Hydrocarbon Layer | | | | | 3.2 | .053 | 7.2 | .120 | 14.5 | .241 | 23.4 | .391 |
| Gas Products From Reactor, Liters (STP) | 0.05 | | .05 | | .20 | | .27 | | .15 | | .23 | |
| Mole Percent of Olefin Charge to Reactor Actually Recovered from Reactor as T-Amyl Alcohol | 3.6 | | 5.9 | | 8.0 | | 21.4 | | 5.0 | | 23.8 | |

By comparing the results of tests 1, 3 and 5 of Table 1, all of which tests were conducted with methyl butene in the vapor phase, it is seen that the 3.6 mole percent of reactor olefin charge actually recovered as tertiary amyl alcohol in the absence of a solvent was only increased to 8.0 mole percent by employing an acetic acid solvent and was only increased to 5.0 mole percent by employing an isopropyl alcohol solvent. However, by comparing tests 2, 4 and 6 of Table 1, all of which tests were conducted with methyl butene in the liquid phase, it is seen that the 5.9 mole percent of reactor olefin charge actually recovered as tertiary amyl alcohol in the absence of a solvent was increased about three and one-half times to 21.4 mole percent by employing an acetic acid solvent and was increased almost fourfold to 23.8 mole percent by employing isopropyl alcohol as a solvent.

The data of Table 1, therefore, not only show the advantage of employing a solvent in a hydration reaction but also shows the criticality, when employing a solvent, of having the olefin reactant in the liquid phase. The data in Table 1 show that in tests made wherein the water and the solvent are in the liquid phase but the olefin reactant is in the vapor phase the solvent was capable of increasing the mole percent of methyl butene charge recovered from the reactor as tertiary butyl alcohol to a maximum of only 8.0 mole percent whereas when the pressure was raised only slightly so that the olefin reactant was liquefied, other conditions remaining unchanged, the presence of the solvent increased the mole percent of methyl butene charge recovered from the reactor as tertiary amyl alcohol to the exceptionally high value of 23.8 mole percent. Table 1 therefore shows that employing a liquid solvent of this invention and maintaining the olefin reactant in the liquid phase are interdependent features.

The data of tests 2, 4 and 6 of Table 1 are in sharp contrast to conventional processes for hydration of $C_4$ and higher olefins, not employing a solvent, wherein the established practice is the reaction of gaseous olefin with liquid water. The reason that in previous hydration processes for the reaction of a $C_4$ or higher olefin with water the olefin was reacted in the vapor phase with water in the liquid phase is that these olefins in the liquid phase are immiscible with liquid water. Therefore, in a process such as hydration where it is necessary that both olefin and water together contact the catalyst to form an alcohol and that one reactant does not shield the surface of the catalyst from the other, it was considered that superior catalyst contact could only be achieved with a gas and a liquid as compared to attempting to expose the catalyst surface to two immiscible liquids. It was considered that the reaction would not proceed satisfactorily if both water and olefin were in the liquid state since they are mutually immiscible as liquids.

Table 2 shows the results of further tests employing Amberlite IR-120 protonated ion exchange resin catalyst in continuous flow hydration operations. These tests illustrate the effect of solvent addition on conversion of the isobutylene in a $C_4$ refinery stream to tertiary butyl alcohol. The $C_4$ refinery stream had the following composition:

| Component: | Composition: percent by weight |
|---|---|
| n-Propane | 2.03 |
| Propylene | 0.52 |
| Isobutane | 23.08 |
| n-Butane | 10.51 |
| Isobutylene | 22.57 |
| Butene-1 | 14.23 |
| Cis-Butene-2 | 9.10 |
| Trans-Butene-2 | 16.22 |
| Butadiene | 0.27 |
| $C_5$ hydrocarbons | 1.01 |
| $C_6$ hydrocarbons | 0.45 |

In the first test illustrated in Table 2 no solvent was employed, while in the second test isopropanol was added to the feed water as a solvent. In the second test the mole ratio of isopropanol to isobutylene was 0.48:1 and the mole ratio of water to isobutylene was 4:1.

TABLE 2

*Effect of solvent addition on conversion of isobutylene in a $C_4$ refinery stream to tertiary butyl alcohol*

| | |
|---|---|
| Solvent to water volume ratio | 1:2 |
| Temperature, °F. | 200 |
| Pressure, pounds per square inch gauge | 265 |

Space velocity, 1.0 liquid volumes of olefin per hour per volume of catalyst.

| Solvent: | Conversion, percent |
|---|---|
| None | 32.0 |
| Isopropanol | 47.2 |

As indicated above, the temperature and pressure during the tests illustrated in Table 2 were 200° F. and 265 pounds per square inch gauge, respectively. Since at the 200° F. temperature of the tests the vapor pressures of isobutylene, butene-1, cis-butene-2, and trans-butene-2, each of which is contained in the charge in considerable proportion, are all below the test pressure of 265 pounds per square inch gauge, each of these olefins was present in the reactor in the liquid state.

As shown in Table 2, when no solvent is employed the conversion to the alcohol is 32.0 mole percent. When isopropanol is employed as a solvent the conversion obtained for a throughput of four volumes of olefin per volume of catalyst is 47.2 mole percent. This is 48 percent higher than is obtained at the same operating conditions without isopropanol.

All of the tests illustrated above which employ an alcohol as a solvent show the use of an extraneous alcohol as a solvent for the product alcohol. It is also within the purview of this invention to produce the solvent alcohol in situ with the principal hydration reaction. This is accomplished by feeding to the reactor a second olefin in addition to the olefin it is primarily desired to hydrate and allowing both olefins to hydrate. The olefin selected to produce the solvent alcohol should hydrate at a more rapid rate so that the solvent effect of the initially produced alcohol is exerted for the hydration of the first olefin. Also, the second olefin should hydrate to form a corresponding alcohol which is miscible with both the first olefin and water. In this manner the second olefin will be hydrated in situ to form the solvent alcohol and this solvent alcohol will serve to carry away the principal alcohol, thereby aiding in the principal hydration reaction. It is necessary that a sufficient quantity of the second alcohol be produced to exert an adequate solvent effect. Accordingly, the quantity of the second olefin is such that between 0.05 to 0.5 volume of solvent alcohol is produced per volume of water remaining available for conversion. If desired, more than one solvent alcohol can be produced in this manner.

The conversion of olefins to alcohols by catalytic hydration tends to decrease sharply as molecular weight increases. For example, conversions where no solvent is employed are appreciably lower in the case of $C_4$, $C_5$, $C_6$ and higher olefins than in the case of $C_2$ and $C_3$ olefins. In the case of the low molecular weight molecules the feed olefin and product alcohol are both highly soluble in water. However, in the case of the higher molecular weight molecules both the feed olefin and product alcohol solubility in water decreases sharply. The function of the solvents employed in accordance with this invention is to dissolve and remove the product alcohol from the system without dissolving the water and olefin phases in each other. For this reason it is necessary to employ a solvent which is miscible with water to produce a water-solvent solution in which the product alcohol is soluble but in which the feed olefin is insoluble and which is miscible with olefin to produce an olefin-solvent solution in which the product alcohol is soluble but in which the water feed is insoluble.

Tests have been made which clearly show that the solvents of this invention cause increased solubility of the product alcohol in the water phase without concomitantly dissolving the olefin in the water phase. Table 3 shows the solubility of a $C_4$ alcohol, secondary butyl alcohol, and a $C_5$ alcohol, tertiary amyl alcohol, in each of a number of solvents which can be employed in accordance with this invention. The solubility tests were conducted employing the solvents as a 50–50 percent by volume mixture of the solvent and water. Table 3 also presents data relating to the solubility of olefins in the same solvents.

TABLE 3

*Solubility of methylbutenes, secondary butyl alcohol, and tertiary amyl alcohol in 50–50 water-solvent mixtures*

| Solute | Solvent | Solubility, g. solute/100 cc. of solvent | °F. |
|---|---|---|---|
| Tertiary-amyl alcohol | Water | 9.84 | 75 |
| Do | Dioxane-water | Completely | 75 |
| Do | Acetone-water | do | 75 |
| Do | Ethylene glycol monomethyl ether-water | do | 75 |
| Do | Acetic acid-water | do | 75 |
| Secondary butyl alcohol | Water | 16.1 | 75 |
| Do | Dioxane-water | Completely | 75 |
| Do | Acetone-water | do | 75 |
| Do | Ethylene glycol monomethyl ether-water | do | 75 |
| Do | Acetic acid-water | do | 75 |
| 2-methyl-butene-1 and 2-methyl-butene-2 | Water | Insoluble (<1) | 36–38 |
| Do | Dioxane-water | Insoluble | 36–38 |
| Do | Ethylene-glycol monomethyl ether-water | <1 | 36–38 |
| Do | Acetic acid-water | <1 | 36–38 |
| Do | Acetone-water | <1 | 36–38 |

Table 3 shows that the 50–50 solvent water mixture dissolves both secondary butyl alcohol and tertiary amyl alcohol completely, while certain corresponding olefins, 2-methyl-butene-1 and 2-methyl-butene-2 are virtually insoluble in the same solvent-water mixtures.

The beneficial effect of product alcohol solvents in accordance with this invention can be applied to the hydration of other high molecular weight olefins such as hexene, heptene, and higher olefins which are capable of being hydrated. Also, a beneficial effect can be accomplished by adding a low molecular weight olefin, such as propylene, to an olefin feed stream comprising higher olefins whereby the low molecular weight olefin produces a water miscible alcohol to form a resulting low molecular weight alcohol-water mixture in which the higher alcohols themselves are soluble.

Various changes and modifications can be made without departing from the spirit of this invention and the scope thereof as defined in the following claims.

We claim:
1. In a process for the hydration with water over a solid hydration catalyst of an olefin selected from the group consisting of $C_4$ olefins, $C_5$ olefins, $C_6$ olefins and $C_7$ olefins to form a corresponding product alcohol in the liquid state, the improvement of maintaining both said olefin and said water reactants in the liquid state, reacting said olefin and said water in the presence of a solvent other than product alcohol, said solvent being in the liquid state and being miscible with the reactants to form solvent containing solution, said solvent increasing the solubility of product alcohol, said solvent maintaining said liquid olefin and said liquid water in separate liquid phases, said phases in the presence of said solvent being insoluble in each other so that said water phase is substantially free of olefin.

2. In a process for the hydration with water over a solid hydration catalyst of an olefin selected from the group consisting of $C_4$ olefins, $C_5$ olefins, $C_6$ olefins and $C_7$ olefins to form a corresponding product alcohol in the liquid state, the improvement of maintaining both said olefin and said water reactants in the liquid state, reacting said olefin and said water in the presence of an oxygenated organic solvent other than product alcohol, said solvent being in the liquid state and being miscible with the reactants to form solvent containing solution, said solvent increasing the solubility of product alcohol, said solvent maintaining said liquid olefin and said liquid water in separate liquid phases, said phases in the presence of said solvent being insoluble in each other so that said water phase is substantially free of olefin.

3. Claim 2 wherein said oxygenated organic solvent other than product alcohol is selected from the group consisting of methyl alcohol, ethyl alcohol, normal propyl alcohol, isopropyl alcohol, tertiary butyl alcohol, dioxane, acetone, ethylene glycol monomethyl ether and acetic acid.

4. In a process for the hydration with water over a solid hydration catalyst of a first olefin selected from the group consisting of $C_4$ olefins, $C_5$ olefins, $C_6$ olefins and $C_7$ olefins to form a corresponding first alcohol in the liquid state, the improvement of maintaining both said first olefin and said water reactants in the liquid state, conducting said hydration in the presence of a second olefin selected from the group consisting of $C_2$, $C_3$ and iso-$C_4$ olefins to produce a corresponding second alcohol other than said first alcohol, said second alcohol being in the liquid state and being miscible with said first reactants to form second alcohol containing solution for increasing the solubility of said first alcohol, said second alcohol maintaining said first olefin and the water in separate liquid phases, said phases being insoluble in each other so that said water phase is substantially free of said first olefin.

5. In a process for the hydration with water over a solid hydration catalyst of an olefin selected from the group consisting of $C_4$ olefins, $C_5$ olefins, $C_6$ olefins and $C_7$ olefins to form a corresponding product alcohol in the liquid state, the improvement comprising maintaining both said olefin and said water reactants in the liquid state, reacting said olefin and said water in the presence of a solvent other than product alcohol, said solvent being in the liquid state and being miscible with said olefin reactant to form a solution containing solvent and olefin and also miscible with said water reactant to form a separate solution containing solvent and water, said solvent increasing the solubility of product alcohol in said olefin reactant and in said water reactant, said solvent maintaining said liquid olefin and said liquid water in separate liquid phases so that the olefin phase is substantially free of water and the water phase is substantially free of olefin.

6. In a process for the hydration with water over a solid hydration catalyst of an olefin selected from the group consisting of $C_4$ olefins, $C_5$ olefins, $C_6$ olefins and $C_7$ olefins to form a corresponding product alcohol in the liquid state, the improvement comprising maintaining both said olefin and said water reactants in the liquid state, reacting said olefin and said water in the presence of an oxygenated organic solvent other than product alcohol, said solvent being in the liquid state and being miscible with said olefin reactant to form a solution containing solvent and olefin and also miscible with said water reactant to form a separate solution containing solvent and water, said solvent increasing the solubility of product alcohol in said olefin reactant and in said water reactant, said solvent maintaining said liquid olefin and said liquid water in separate liquid phases, said phases in the presence of said solvent being substantially insoluble in each other so that the olefin phase is substantially free of water and the water phase is substantially free of olefin.

7. In a process for the hydration with water over a solid hydration catalyst of a first olefin selected from the group consisting of $C_4$ olefins, $C_5$ olefins, $C_6$ olefins and $C_7$ olefins to form a corresponding first alcohol in the liquid state, the improvement comprising maintaining both said first olefin and said water reactants in the liquid state, conducting said hydration in the presence of a second olefin selected from the group consisting of $C_2$, $C_3$ and iso-$C_4$ olefins to produce a corresponding second alcohol other than said first alcohol, said second alcohol being in the liquid state and being miscible with said first olefin reactant and said water reactant to form a second alcohol containing solution with said first olefin reactant and a separate second alcohol containing solution with said water for increasing the solubility of said first alcohol in said first olefin reactant and in said water reactant, said second alcohol maintaining said first olefin and said water in separate liquid phases so that the first olefin phase is substantially free of water and the water phase is substantially free of said first olefin.

References Cited by the Examiner

UNITED STATES PATENTS 2,042,212  5/1936  Deanesly _____ 260—641

OTHER REFERENCES

Seidell: "Solubilities of Organic Compounds," 3rd. Ed., vol. 2, (1940).

Lange: "Handbook of Chemistry," 6th Ed., (1946).

Kammermeyer et al.: Alcohols by Hydration of Olefins, FIAT Final Report 968, Field Information Agency, Technical, April 2, 1947, pages 8, 11, 20, 21, 22.

LEON ZITVER, *Primary Examiner.*

B. M. EISEN, M. P. ROBERTO, H. G. MOORE, J. E. EVANS, *Assistant Examiners.*